United States Patent
Li

(10) Patent No.: US 10,338,442 B2
(45) Date of Patent: Jul. 2, 2019

(54) LIQUID CRYSTAL DISPLAY PANEL STRUCTURE

(71) Applicant: Shenzhen China Star Optoelectronics Semiconductor Display Technology Co., Ltd., Shenzhen (CN)

(72) Inventor: Wenying Li, Shenzhen (CN)

(73) Assignee: SHENZHEN CHINA STAR OPTOELECTRONICS SEMICONDUCTOR DISPLAY TECHNOLOGY CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 15/570,368

(22) PCT Filed: Jul. 13, 2017

(86) PCT No.: PCT/CN2017/092728
§ 371 (c)(1),
(2) Date: Oct. 30, 2017

(87) PCT Pub. No.: WO2018/218745
PCT Pub. Date: Dec. 6, 2018

(65) Prior Publication Data
US 2018/0341156 A1 Nov. 29, 2018

(30) Foreign Application Priority Data

May 27, 2017 (CN) .......................... 2017 1 0393645

(51) Int. Cl.
*G02F 1/1343* (2006.01)
*G02F 1/1362* (2006.01)

(52) U.S. Cl.
CPC .. *G02F 1/134336* (2013.01); *G02F 1/136286* (2013.01); *G02F 2001/134345* (2013.01); *G02F 2201/122* (2013.01); *G02F 2201/123* (2013.01); *G02F 2201/52* (2013.01)

(58) Field of Classification Search
CPC . H01L 29/66765; H01L 21/775; H01L 27/12; G02F 1/134336; G02F 2201/123
USPC .............. 257/59, 72; 438/48, 128, 149, 151
See application file for complete search history.

(56) References Cited

U.S. PATENT DOCUMENTS

2007/0165150 A1 * 7/2007 Chai .................. G02F 1/13624
349/42

FOREIGN PATENT DOCUMENTS

| CN | 1738501 A | 2/2006 |
|---|---|---|
| CN | 102856320 A | 1/2013 |
| CN | 204904733 U | 12/2015 |
| CN | 105261325 A | 1/2016 |
| CN | 106019749 A | 10/2016 |

(Continued)

OTHER PUBLICATIONS

English translation of JP2007102004 A by Choi date Apr. 2007.*

*Primary Examiner* — Thinh T Nguyen
(74) *Attorney, Agent, or Firm* — Leong C. Lei

(57) ABSTRACT

The present invention provides a liquid crystal display panel structure in which the red sub-pixel, the green sub-pixel, and the blue sub-pixel of each pixel are arranged in two adjacent sub-pixel rows and the shape of the pixel is L-typed or inverted L-typed. The number of data lines can be reduced to ⅔ or ⅓ of the existing technology, then, the cost of liquid crystal display panels is reduced to enhance the competitiveness of products.

9 Claims, 8 Drawing Sheets

(56) References Cited

FOREIGN PATENT DOCUMENTS

| JP | 2007102004 A | * | 4/2007 |
| JP | 2008298966 A | | 12/2008 |

* cited by examiner

LIQUID CRYSTAL DISPLAY PANEL STRUCTURE

BACKGROUND OF THE INVENTION

Field of Invention

The present invention relates to the field of liquid crystal display, and more particularly to a liquid crystal display panel structure.

Description of Conventional Art

The LCD (Liquid Crystal Display) possesses many advantages of being thin case, power saved and radiation free. It has been widely utilized in, such as LCD TVs, mobile phones, Personal Digital Assistant (PDAs), digital cameras, laptop screens or notebook screens.

Liquid crystal displays on the existing markets typically comprise a housing, a liquid crystal display panel disposed within the housing, and a backlight module (Backlight Module) located within the housing. The liquid crystal display panel is composed of a Color Filter (CF) substrate, a thin film transistor array substrate (TFT Array Substrate), and a liquid crystal layer disposed between the two substrates. The working principle of which is to control the rotation of the liquid crystal molecules of the liquid crystal layer by applying a driving voltage to the two glass substrates, and the light of the backlight module is refracted to produce an image.

Please refer to FIG. 1, the conventional liquid crystal display panel has a plurality of pixels P' arranged in a matrix, each of which includes a red sub-pixels R, a green sub-pixels G and the blue sub-pixel B orderly arranged in the same row from left to right, the pixel P' is represented as a rectangle, and the color of the same sub-pixel column is the same. In order to drive the each pixels P', the conventional liquid crystal display panel is provided with a scanning line horizontally extending with respect to a sub-pixel row, and a data line longitudinally extending is provided with respect to a sub-pixel column. As shown in FIG. 1, "a" and "b" are assumed as positive integers, a a-th data line Da is disposed at the left side of a a-th sub-pixel column, a n-th scanning line Gn is disposed at the upper side of a n-th sub-pixel row. The n-th scanning line Gn is used to control the n-th sub-pixel row. The a-th data line Da is used to transmit the data signal to the a-th sub-pixel column. The sub-pixel of the n-th row and the a-th column is electrically connected with the a-th data line Da and the n-th scanning line Gn.

The structure of the conventional liquid crystal display panel has some drawbacks, mainly in the number of data lines is 3 times the number of the pixel P' row (i.e., three times of the vertical resolution), for example, the resolution in the vertical direction is 1920, then the number of data lines required is 1920×3, so the number of data drivers is more, which is not beneficial to the LCD panel cost reduction.

SUMMARY OF THE INVENTION

An object of the present invention is to provide a liquid crystal display panel structure, which is capable of reducing the number of data lines, reducing the cost of the liquid crystal display panel, and enhancing the competitiveness of the product.

In order to achieve the object, the present invention provides a liquid crystal display panel structure, which comprises a plurality of scanning lines extending laterally and lining up longitudinally with order, a plurality of data lines extending longitudinally and lining up laterally with order, and a plurality of sub-pixels arranged in an array. The plurality of sub-pixels are arranged in an array comprise a plurality of red sub-pixels, a plurality of green sub-pixels, and a plurality of blue sub-pixels.

A red sub-pixel, a green sub-pixel, and a blue sub-pixel constitute a pixel. The red sub-pixel, the green sub-pixel, and a blue sub-pixel of the pixel distributed in two rows of adjacent sub-pixels.

A shape of the pixel is L-type or inverted L-type.

A first structural form: one scanning line is disposed with respect to each sub-pixel row, and one data line is disposed with respect to each sub-pixel column.

"a" is assumed as a positive integer. An a-th scanning line is disposed at the upper side of an a-th sub-pixel row. All sub-pixels of the a-th row are electrically connected with the a-th scanning line. "b" is assumed as a positive integer. A b-th data line is disposed at the left side of a b-th sub-pixel column. All sub-pixels of the b-th column are electrically connected with the b-th data line. Only two data lines are disposed with each pixel column.

Optional, the sub-pixels of every 3 rows and 6 columns are a structural unit. In the structural unit, each sub-pixel row comprises the sub-pixels of two colors, and the sub-pixels of two adjacent rows only comprise the sub-pixels of one color in common.

Optional, the sub-pixels of every 3 rows and 6 columns are a structural unit. In the structural unit, each sub-pixel row comprises the sub-pixels of three colors, and the number of the sub-pixels of the same color of each sub-pixel row is the same.

Optional, the sub-pixels of every 3 rows and 6 columns are a structural unit. In the structural unit, a first sub-pixel row comprises the sub-pixels of two colors, the second sub-pixel row comprises sub-pixels of another color different from the two colors of the first sub-pixel row, and the third sub-pixel row is the same as the first sub-pixel row.

A second structural form: two scanning line is disposed with respect to each sub-pixel row, and one data line is disposed with respect to two columns of sub-pixel.

"m" is assumed as a positive integer. A (2m−1)th scanning line is disposed at the upper side of an m-th sub-pixel row, a (2m)th scanning line is disposed the bottom side of the m-th sub-pixel row. All odd-columned sub-pixels of the m-th row are electrically connected with the (2m−1)th scanning line, all even-columned sub-pixels of the m-th row are electrically connected with the (2m)th scanning line. "n" is assumed as a positive integer. A n-th data line is disposed between a (2n−1)th sub-pixel column and a 2n-th sub-pixel column. The (2n−1)th sub-pixel column and the 2n-th sub-pixel column are electrically connected with the n-th data line. Only one data line is disposed with each pixel column.

Optional, the sub-pixels of every 3 rows and 6 columns are a structural unit. In the structural unit, each sub-pixel row comprises the sub-pixels of two colors, and the sub-pixels of two adjacent rows only comprise the sub-pixels of one color in common.

Optional, the sub-pixels of every 3 rows and 6 columns are a structural unit. In the structural unit, each sub-pixel row comprises the sub-pixels of three colors, and the number of the sub-pixels of the same color of each sub-pixel row is different.

Optional, the sub-pixels of every 3 rows and 6 columns are a structural unit. In the structural unit, a first sub-pixel row comprises the sub-pixels of two colors, the second sub-pixel row comprises sub-pixels of another color different from the two colors of the first sub-pixel row, and the third sub-pixel row is the same as the first sub-pixel row.

The present invention further provides another liquid crystal display panel structure, which comprises a plurality of scanning lines extending laterally and lining up longitudinally with order, a plurality of data lines extending longitudinally and lining up laterally with order, and a plurality of sub-pixels arranged in an array. The plurality of sub-pixels arranged in an array comprise a plurality of red sub-pixels, a plurality of green sub-pixels, and a plurality of blue sub-pixels.

A red sub-pixel, a green sub-pixel, and a blue sub-pixel constitute a pixel. The red sub-pixel, the green sub-pixel, and a blue sub-pixel of the pixel distributed in two rows of adjacent sub-pixels.

Wherein a shape of the pixel is L-type or inverted L-type.

Wherein two scanning line is disposed with respect to each sub-pixel row, and one data line is disposed with respect to two columns of sub-pixel.

"m" is assumed as a positive integer. A (2m−1)th scanning line is disposed at the upper side of an m-th sub-pixel row, a (2m)th scanning line is disposed the bottom side of the m-th sub-pixel row. All odd-columned sub-pixels of the m-th row are electrically connected with the (2m−1)th scanning line, all even-columned sub-pixels of the m-th row are electrically connected with the (2m)th scanning line. "n" is assumed as a positive integer. A n-th data line is disposed between a (2n−1)th sub-pixel column and a 2n-th sub-pixel column. The (2n−1)th sub-pixel column and the 2n-th sub-pixel column are electrically connected with the n-th data line. Only one data line is disposed with each pixel column.

Wherein the sub-pixels of every 3 rows and 6 columns are a structural unit. In the structural unit, each sub-pixel row comprises the sub-pixels of two colors, and the sub-pixels of two adjacent rows only comprise the sub-pixels of one color in common.

The beneficial effects of the present invention are: the present invention provides a liquid crystal display panel structure in which the red sub-pixel, the green sub-pixel, and the blue sub-pixel of each pixel are arranged in two adjacent sub-pixel rows and the shape of the pixel is L-typed or inverted L-typed. The number of data lines can be reduced to ⅔ or ⅓ of the existing technology, then, the cost of liquid crystal display panels is reduced to enhance the competitiveness of products.

BRIEF DESCRIPTION OF THE DRAWINGS

For better understanding the technical proposals and other beneficial effects of the present invention, please refer the following detailed description of the present invention with the accompanying drawings.

In drawings.

DETAILED DESCRIPTION OF THE PREFERRED EMBODIMENTS

The technical proposals and the effects of the present invention will be described in further detail with reference to the below preferred embodiments of the present invention and their accompanying drawings.

Figure 1:
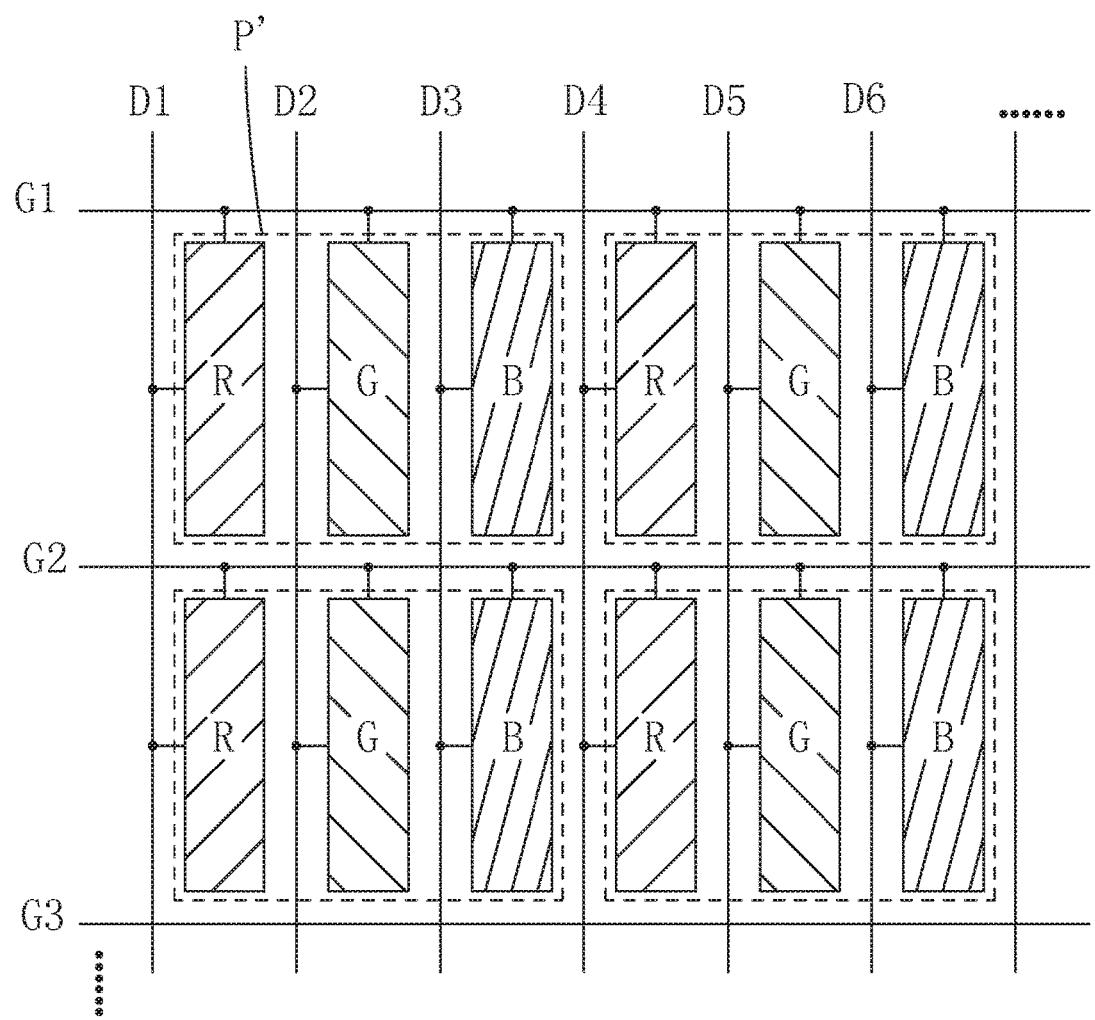
FIG. 1 is a structural diagram of a liquid crystal display panel according to the conventional art.
Figure 2:
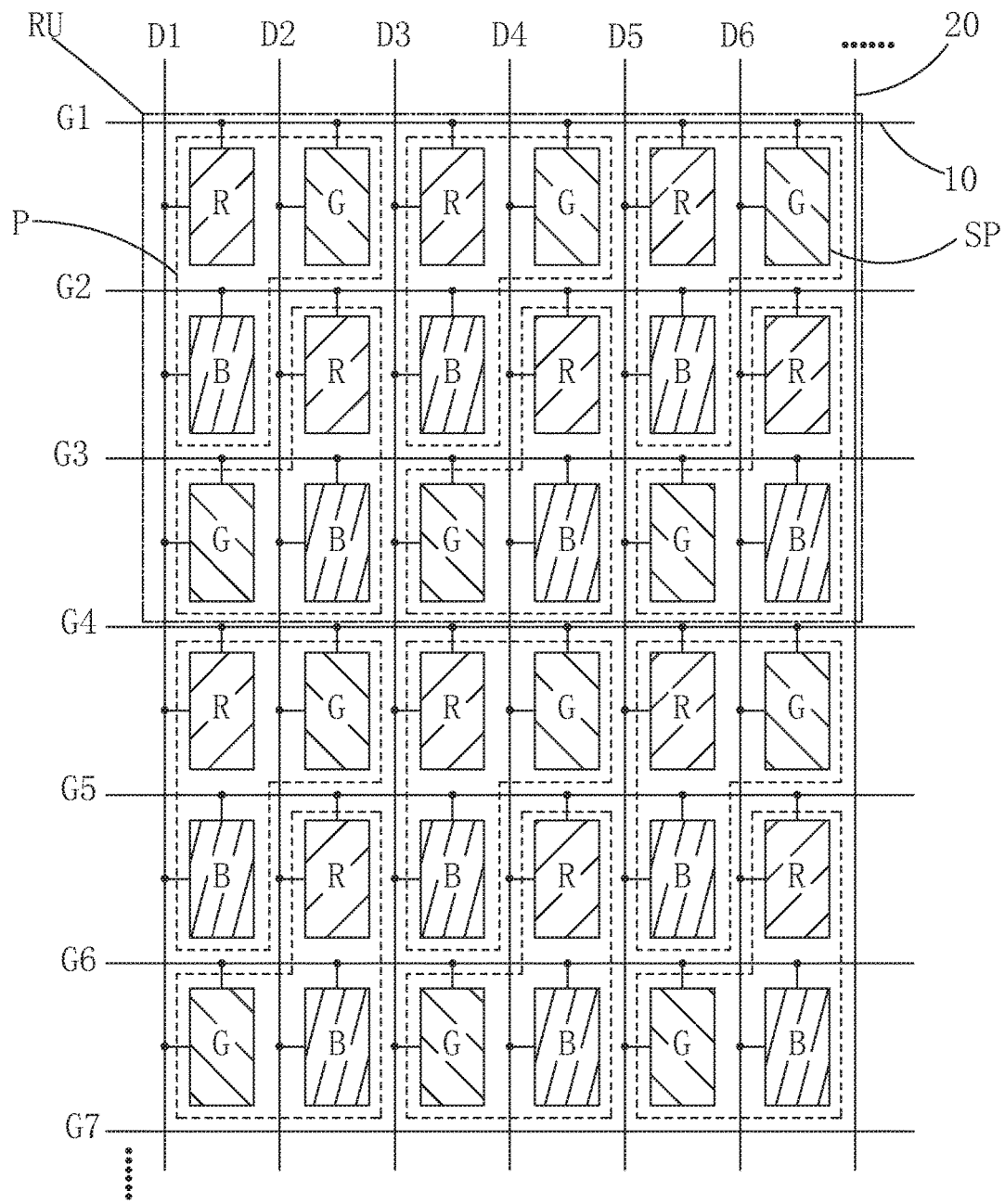
FIG. 2 is a structural diagram of a liquid crystal display panel of a first embodiment according to the present invention.

The present invention provides a liquid crystal display panel structure. FIG. 2 is a structural diagram of a liquid crystal display panel of a first embodiment according to the present invention, which comprises a plurality of scanning lines 10 (such as G1, G2, G3, G4, G5, G6, G7) extending laterally and lining up longitudinally with order, a plurality of data lines 20 (such as D1, D2, D3, D4, D5, D6) extending longitudinally and lining up laterally with order, and a plurality of sub-pixels SP arranged in an array. The plurality of sub-pixels SP arranged in an array comprise a plurality of red sub-pixels R, a plurality of green sub-pixels and a plurality of blue sub-pixels B.

The first embodiment takes the sub-pixels SP of every 3 rows and 6 columns as a structural unit RU. In the structural unit RU, each sub-pixel SP row comprises the sub-pixels SP of two colors, and the sub-pixels SP of two adjacent rows only comprises the sub-pixels SP of one color in common. For example, the first sub-pixel SP row is repeatedly arranged from left to right in the order of the red sub-pixel R and the green sub-pixel G; the second sub-pixel SP is repeatedly arranged from left to right in the order of the blue sub-pixel B and the red sub-pixel R; and the third sub-pixel SP is repeated from left to right in the order of the green sub-pixel G and the blue sub-pixel B.

A red sub-pixel R, a green sub-pixel and a blue sub-pixel B constitute a pixel SP. The red sub-pixel R, the green sub-pixel and a blue sub-pixel B of the pixel SP distributed in two rows of adjacent sub-pixels SP. Please refer to FIG. 2, for example, the red sub-pixel R of the first row and first column, the green sub-pixel G of the first row and the second column, and the blue sub-pixel B of the second row and the first column constitute a pixel P having a shape of upside down L-type. The red sub-pixel R of the second row and the second column, the green sub-pixel G of the third row and the first column, and the blue sub-pixel B of the third row and the second column constitute a pixel P having a shape of left and right reversed L-type. The red sub-pixel R of the first row and the third column, the green sub-pixel G of the first row and the fourth column, and the blue sub-pixel B of the second row and the third column constitute a pixel P having a shape of upside down L-type. The red sub-pixel R of the second row and the fourth row, the green sub-pixel G of the third row and the third column, and the blue sub-pixel B in the third row and the fourth column constitute a pixel P having a shape of left and right reversed L-type, and so on. As seen from FIG. 2, the shapes of the two pixels P adjacent to each other in up-down and left-right directions are complementary to be a rectangle.

In the first embodiment: one scanning line 10 is disposed with respect to each sub-pixel SP row, and one data line 20 is disposed with respect to each sub-pixel SP column. "a" is assumed as a positive integer. An a-th scanning line Ga is disposed at the upper side of an a-th sub-pixel SP row. All sub-pixels SP of the a-th row are electrically connected with the a-th scanning line Ga. For example, the first scanning line G1 is disposed at the upper side of the first sub-pixel SP row, the first sub-pixel SP row is electrically connected with the first scanning line G1, and the second scanning line G2 is disposed at the upper side of the second row of the sub-pixels SP and the second sub-pixel SP row is electrically connected with the second scanning line G2; and so on. "b" is assumed as a positive integer. A b-th data line Db is disposed at the left side of a b-th sub-pixel SP column. All sub-pixels SP of the b-th column are electrically connected with the b-th data line Db. For example, the first data line D1 is disposed at the left side of the first sub-pixel SP column, the first sub-pixel SP column is electrically connected with the first data line D1, and the second data line D2 is disposed at the left side of the second sub-pixel SP column, the second sub-pixel SP column is electrically connected with the second data line D2, and so on.

Since the red sub-pixel R, the green sub-pixel and the blue sub-pixel B in each pixel P are distributed in the adjacent two sub-pixel SP rows in the present invention, the arrangement of occupying three columns of the three sub-pixels SP in each pixel P is changed into the arrangement of occupying two columns of the three sub-pixels SP in each pixel P. Only two data lines are disposed with each pixel P column, the number of data lines 20 is twice the number of the pixel P row (vertical resolution). For example, The number of data lines 20 required for the first embodiment is 1920×2, and the conventional art requires 1920×3, it can be seen that the first embodiment of the present invention can reduce the number of data lines 20 to ⅔ of the conventional art, correspondingly, the number of data driver required is reduced, then, the LCD panel cost is reduced to enhance the competitiveness of the product.

Figure 3:
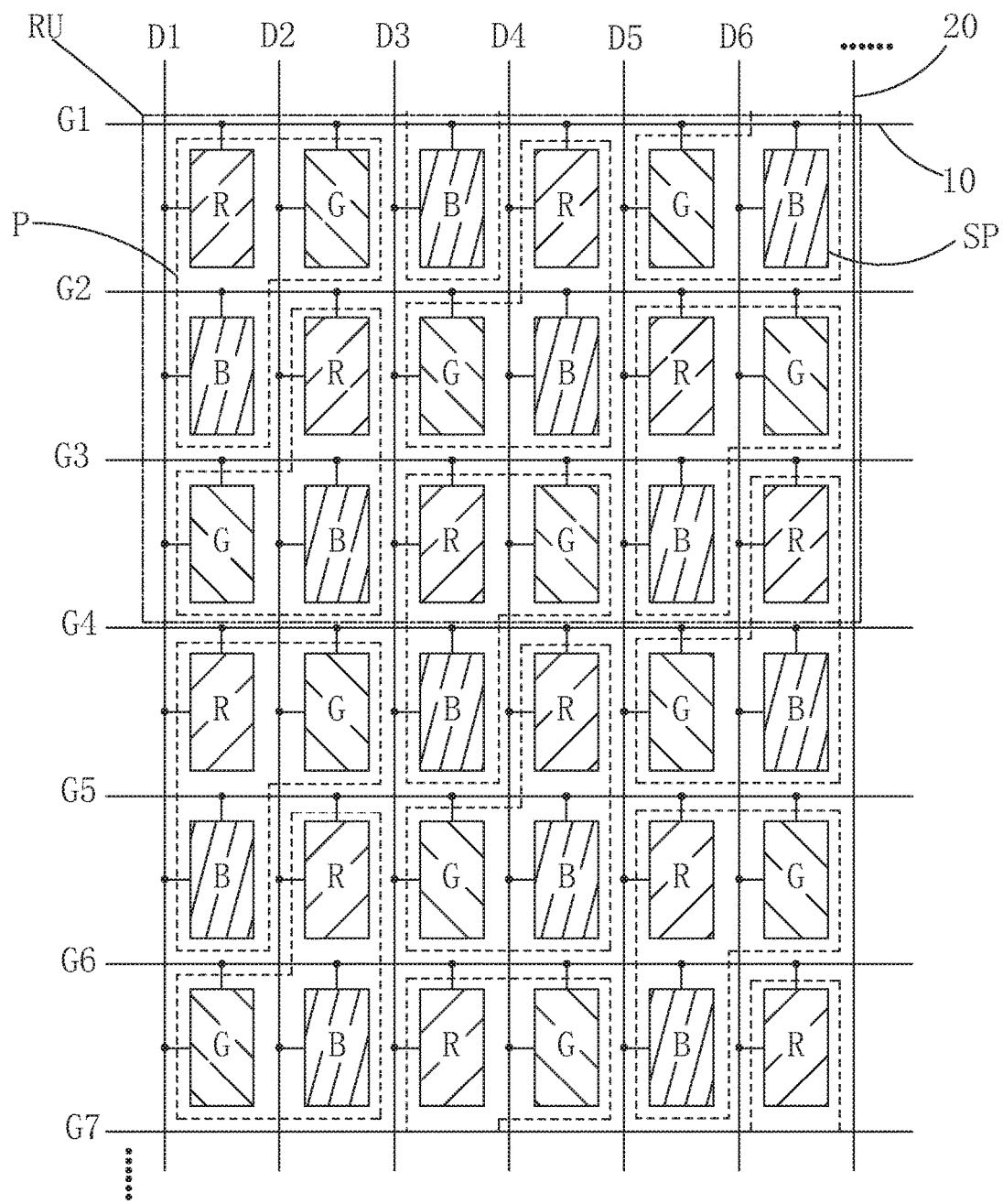
FIG. 3 is a structural diagram of a liquid crystal display panel of a second embodiment according to the present invention.

FIG. 3 is a structural diagram of a liquid crystal display panel of a second embodiment according to the present invention. Comparing the first embodiment and the second embodiment, the similarity is: the red sub-pixel R, the green sub-pixel and the blue sub-pixel B in each pixel P are disposed in the adjacent two sub-pixel SP rows and a scanning line 10 is disposed for each sub-pixel SP row, and one data line 20 is disposed for each sub-pixel SP column. Only two data lines 20 are disposed for each pixel P column and the number of data lines 20 can be reduced to ⅔ of the conventional art.

The difference is: the sub-pixels SP of every 3 rows and 6 columns are a structural unit RU. In the structural unit RU, each sub-pixel SP row comprises the sub-pixels SP of three colors, and the number of the sub-pixels SP of the same color of each row is the same. For example, the first sub-pixel SP row is repeatedly arranged from left to right in the order of the red sub-pixel R, the green sub-pixel and the blue sub-pixel B; the second sub-pixel SP row is repeatedly arranged from left to right in the order of the blue sub-pixel B, the red sub-pixel R, and the green sub-pixels G; and the third sub-pixel SP row is repeatedly arranged from left to right in the order of the green sub-pixel the blue sub-pixel B, and the red sub-pixel R. The number of the sub-pixels SP of each sub-pixel SP row having same color sub-pixel is two.

Specifically, please refer to FIG. 3, the configuration of each pixel P in the second embodiment is described with: the red sub-pixel R of the first row and the first column, the green sub-pixel G of the first row and the second column, and the blue sub-pixel B in the first row and the second column constitutes a pixel P having a shape of upside down L-type. The red sub-pixel R of the second row and the second column, the green sub-pixel G of the third row and the first column, and the blue sub-pixel B of the third row and the second column constitute a pixel P having a shape of left and right reversed L-type. The red sub-pixel R of the third row and the third column, the green sub-pixel G of the third row and the fourth column, and the blue sub-pixel B of the fourth row and the third column a pixel P having a shape of upside down L-type. The red sub-pixel R of the fourth row and the fourth column, the green sub-pixel G of the fifth row and the third column, and the blue sub-pixels B of the fifth row and the fourth column constitute a pixel P having a shape of left and right reversed L-type, and so on. As seen from FIG. 3, the shapes of the two pixels P adjacent to each other in up-down and left-right directions are complementary to be a rectangle.

Figure 4:
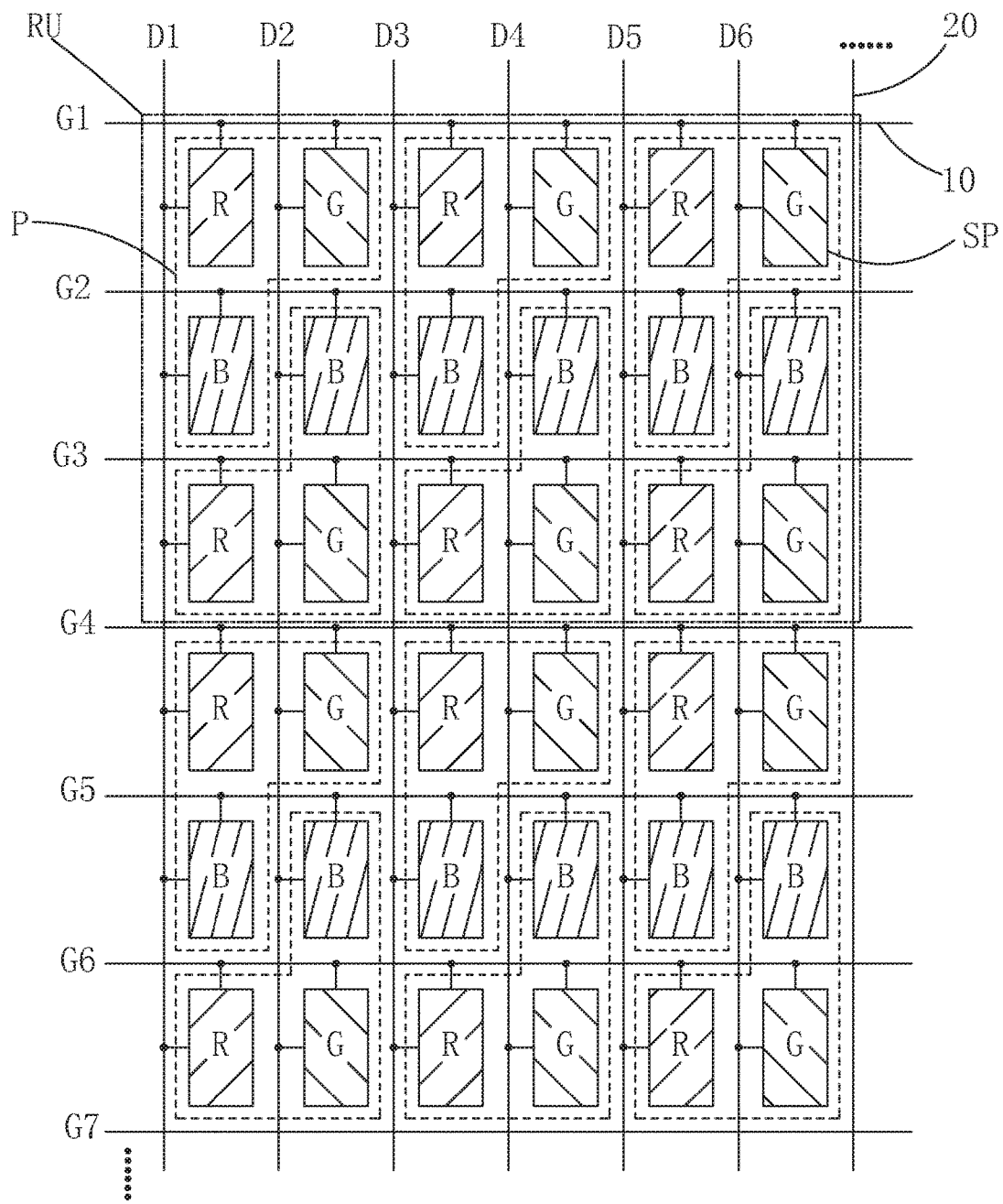
FIG. 4 is a structural diagram of a liquid crystal display panel of a third embodiment according to the present invention.

FIG. 4 is a structural diagram of a liquid crystal display panel of a third embodiment according to the present invention. Comparing the first embodiment and the third embodiment, the similarity is: the red sub-pixel R, the green sub-pixel and the blue sub-pixel B in each pixel P are disposed in the adjacent two sub-pixel SP rows and a scanning line 10 is disposed for each sub-pixel SP row, and one data line 20 is disposed for each sub-pixel SP column. Only two data lines 20 are disposed for each pixel P column and the number of data lines 20 can be reduced to ⅔ of the conventional art.

The difference is: the sub-pixels SP of every 3 rows and 6 columns are a structural unit RU. In the structural unit RU, a first sub-pixel SP row comprises the sub-pixels SP of two colors, the second sub-pixel SP row comprises sub-pixels SP of another color different from the two colors of the first sub-pixel SP row, and the third sub-pixel SP row is the same as the first sub-pixel SP row. For example, the first sub-pixel SP row is repeatedly arranged from left to right in the order of the red sub-pixel R and the green sub-pixel G; the second sub-pixel SP is all the blue sub-pixel B; and the third sub-pixel SP is also repeatedly arranged in the order of the red sub-pixel R and the green sub-pixel G.

Specifically, please refer to FIG. 4, the configuration of each pixel P in the third embodiment is described with: the red sub-pixel R of the first row and the first column, the green sub-pixel G of the first row and the second column, and the blue sub-pixel B in the second row and the first column constitutes a pixel P having a shape of upside down L-type. The blue sub-pixel B of the second row and the second column, the red sub-pixel R of the third row and the first column, and the green sub-pixel G of the third row and the second column constitute a pixel P having a shape of left and right reversed L-type. The red sub-pixel R of the first row and the third column, the green sub-pixel G of the first row and the fourth column, and the blue sub-pixel B of the second row and the third column a pixel P having a shape of upside down L-type. The blue sub-pixel B of the second row and the fourth column, the red sub-pixel R of the third row and the third column, and the green sub-pixels G of the third row and the fourth column constitute a pixel P having a shape of left and right reversed L-type, and so on. As seen from FIG. 4, the shapes of the two pixels P adjacent to each other in up-down and left-right directions are complementary to be a rectangle.

Figure 5:
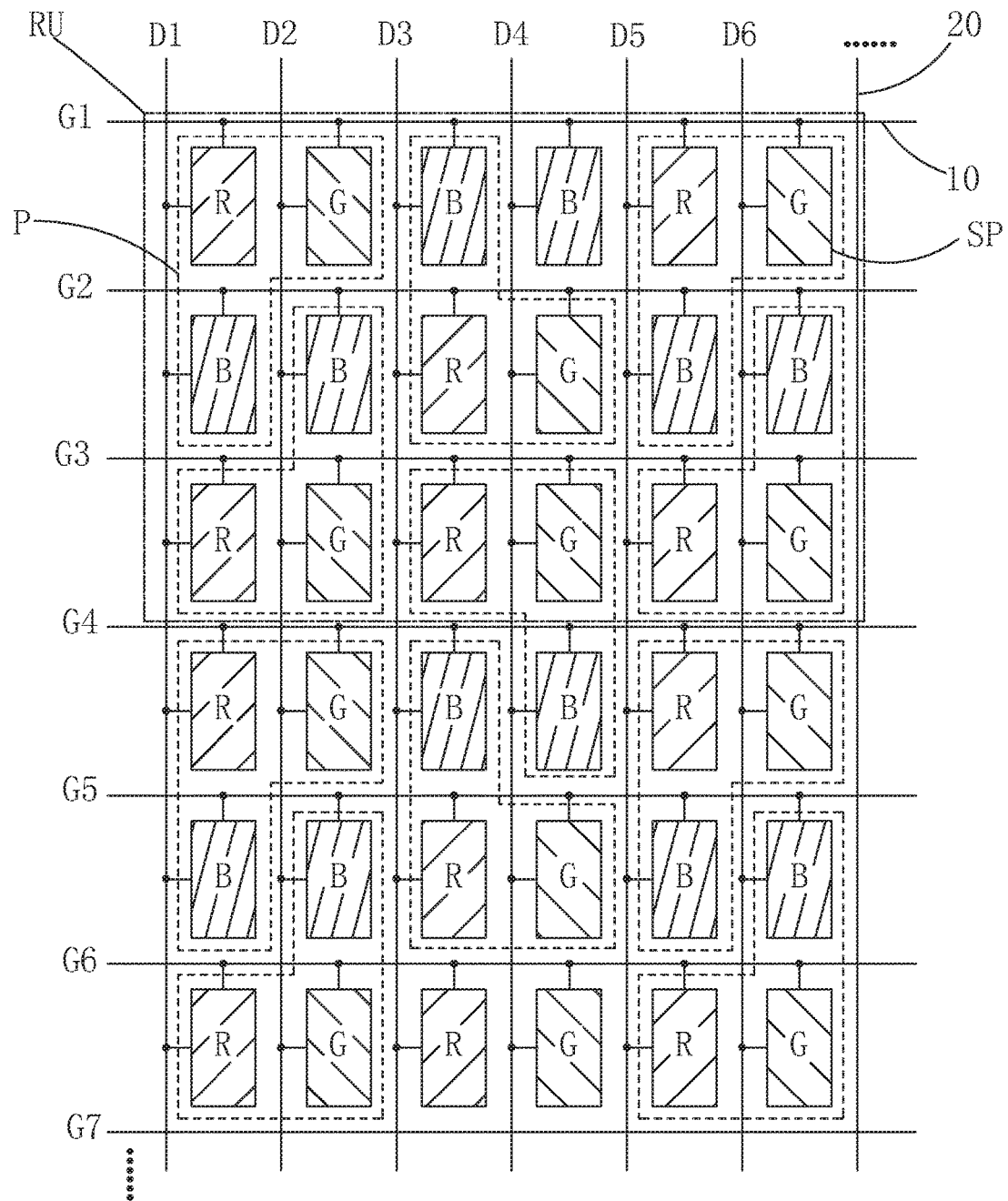
FIG. 5 is a structural diagram of a liquid crystal display panel of a fourth embodiment according to the present invention.

FIG. 5 is a structural diagram of a liquid crystal display panel of a fourth embodiment according to the present invention. Comparing the first embodiment and the fourth embodiment, the similarity is: the red sub-pixel R, the green sub-pixel and the blue sub-pixel B in each pixel P are disposed in the adjacent two sub-pixel SP rows and a scanning line 10 is disposed for each sub-pixel SP row, and one data line 20 is disposed for each sub-pixel SP column. Only two data lines 20 are disposed for each pixel P column and the number of data lines 20 can be reduced to ⅔ of the conventional art.

The difference is: the sub-pixels SP of every 3 rows and 6 columns are a structural unit RU. In the structural unit RU, the first sub-pixel SP row comprises the sub-pixels SP of three colors, the second sub-pixel SP row comprises the sub-pixels SP of three colors, and the third sub-pixel SP row comprises the sub-pixels SP of two colors. The number of the sub-pixels SP of the same color of each sub-pixel SP row is different. For example, the first sub-pixel SP row is arranged from left to right in the order of the red sub-pixel R, the green sub-pixel the blue sub-pixel B, the blue sub-pixel B, the red sub-pixel R, and the green sub-pixel G. The number of the red sub-pixel R is two. The number of the green sub-pixels G is two. The number of the blue sub-pixels B is two. The second sub-pixel SP row is arranged from left to right in the order of the blue sub-pixel B, the blue sub-pixel B, the red sub-pixels R, the green sub-pixel the blue sub-pixel B, and the blue sub-pixel B. The number of the red sub-pixel R is one. The number of the green sub-pixels G is one. The number of sub-pixel B is four. The third sub-pixel SP row is repeatedly arranged from left to right in the order of the red sub-pixel R and the green sub-pixel G The number of the red sub-pixels R is three. The number of the green sub-pixel G is three.

Specifically, please refer to FIG. 5, the configuration of each pixel P in the fourth embodiment is described with: the red sub-pixel R of the first row and the first column, the green sub-pixel G of the first row and the second column, and the blue sub-pixel B in the second row and the first column constitutes a pixel P having a shape of upside down L-type. The blue sub-pixel B of the second row and the second column, the red sub-pixel R of the third row and the first column, and the green sub-pixel G of the third row and the second column constitute a pixel P having a shape of left and right reversed L-type. The red sub-pixel R of the third row and the third column, the green sub-pixel G of the third row and the fourth column, and the blue sub-pixel B of the fourth row and the fourth column a pixel P having a shape of upside down L-type. The blue sub-pixel B of the fourth row and the third column, the red sub-pixel R of the fifth row and the third column, and the green sub-pixels G of the fifth row and the fourth column constitute a pixel P having a shape of left and right reversed L-type, and so on. As seen from FIG. 5, the shapes of the two pixels P adjacent to each other in up-down and left-right directions are complementary to be a rectangle.

Figure 6:
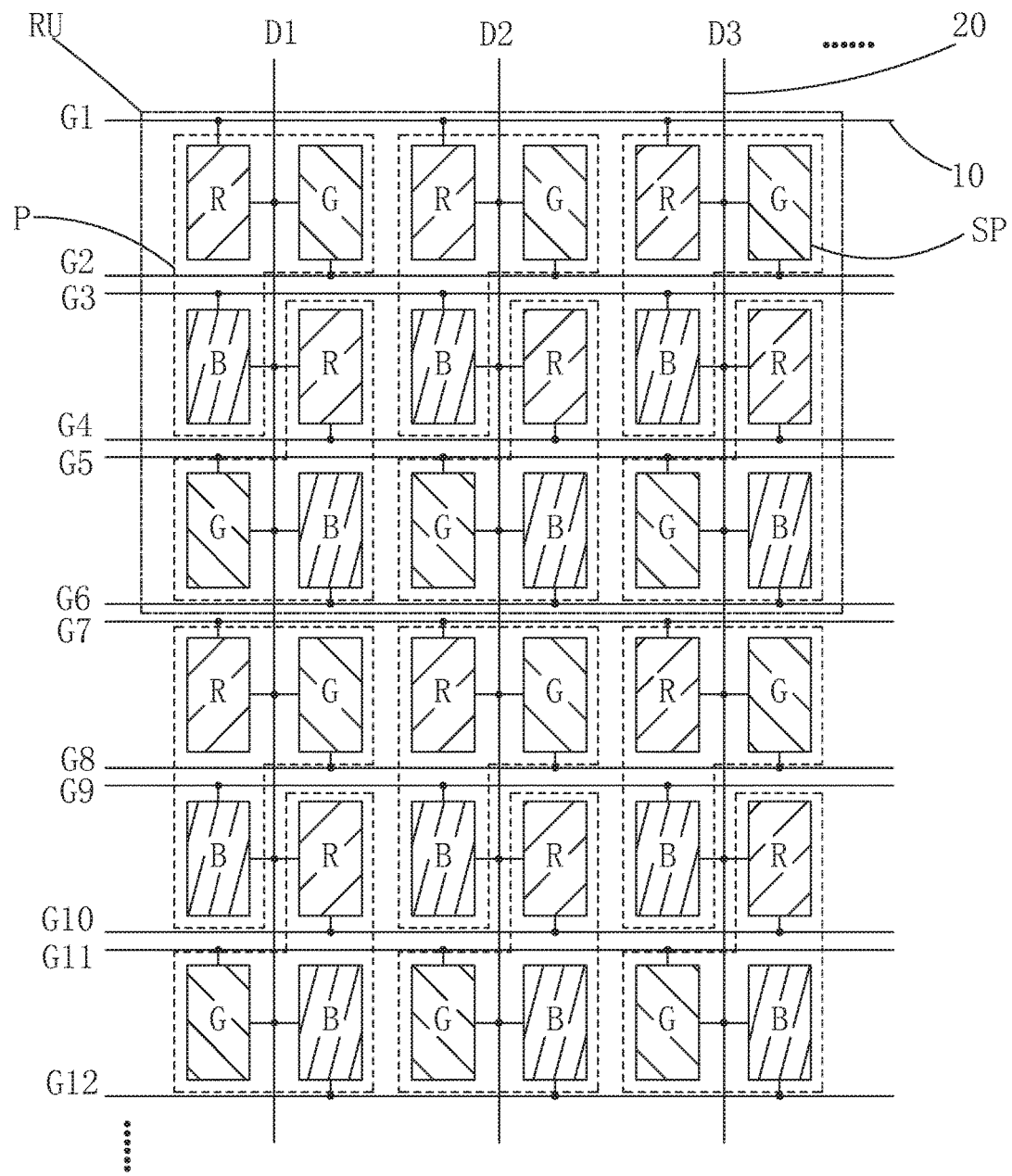
FIG. 6 is a structural diagram of a liquid crystal display panel of a fifth embodiment according to the present invention.

FIG. 6 is a structural diagram of a liquid crystal display panel of a fifth embodiment according to the present invention. Comparing the first embodiment and the fourth embodiment, the similarity is: the red sub-pixel R, the green sub-pixel and the blue sub-pixel B in each pixel P are disposed in the adjacent two sub-pixel SP rows. The sub-pixels SP of every 3 rows and 6 columns are a structural unit RU. In the structural unit RU, each sub-pixel SP row comprises the sub-pixels SP of two colors, and the sub-pixels SP of two adjacent rows only comprises the sub-pixels SP of one color in common. For example, the first sub-pixel SP row is repeatedly arranged from left to right in the order of the red sub-pixel R and the green sub-pixel G; the second sub-pixel SP row is repeatedly arranged from left to right in the order of the blue sub-pixel B and the red sub-pixel R; and the third sub-pixel SP row is repeatedly arranged from left to right in the order of the green sub-pixel G and the blue sub-pixel B.

The difference is: two scanning line 10 is disposed with respect to each sub-pixel SP row, and one data line 20 is disposed with respect to two columns of sub-pixel SP. "m" is assumed as a positive integer. A (2m−1)th scanning line G2$m$-1 is disposed at the upper side of a m-th sub-pixel SP row, a (2m)th scanning line G2$m$ is disposed the bottom side of the m-th sub-pixel SP row. All odd-columned sub-pixels SP of the m-th row are electrically connected with the (2m−1)th scanning line G2$m$-1, all even-columned sub-pixels SP of the m-th row are electrically connected with the (2m)th scanning line G2$m$.

For example, the first scanning line G1 is disposed at the upper side of the first sub-pixel SP row, the second scanning line G2 is disposed at the lower side of the first sub-pixel SP row. All odd-columned sub-pixels SP of the first row are electrically connected with the first scanning line G1. All even-columned sub-pixels SP of the first row are electrically connected with the second scanning line G2. The third scanning line G3 is disposed at the upper side of the second sub-pixel SP row, the fourth scanning line G4 is disposed at the lower side of the second sub-pixel SP row. All odd-columned sub-pixels SP of the second row are electrically connected with the third scanning line G3. All even-columned sub-pixels SP of the second row are electrically connected with the fourth scanning line G4, and so on.

"n" is assumed as a positive integer. An n-th data line Dn is disposed between a (2n−1)th sub-pixel SP column and a 2n-th sub-pixel SP column. The (2n−1)th sub-pixel SP column and the 2n-th sub-pixel SP column are electrically connected with the n-th data line Dn. Only one data line 20 is disposed with each pixel P column. For example, the first data line D1 is disposed between the first sub-pixel SP column and the second sub-pixel SP column, and the first sub-pixel SP column and the second sub-pixel SP column are electrically connected with the first data line D1. The data line D2 is disposed between the third sub-pixel SP column and the fourth sub-pixel SP column, the third sub-pixel SP column and the fourth sub-pixel SP column are electrically connected with the second data line D2, and so on.

Since the red sub-pixel R, the green sub-pixel and the blue sub-pixel B in each pixel P are distributed in the adjacent two sub-pixel SP rows in the present invention, the arrangement of occupying three columns of the three sub-pixels SP in each pixel P is changed into the arrangement of occupying two columns of the three sub-pixels SP in each pixel P. Furthermore, only one data line 20 is disposed with respect to every two columns of sub-pixel in the fifth embodiment, hence, only one data line is disposed with respect to the each pixel P column, the number of data lines 20 is the same as the number of the pixel P row (vertical resolution). For example, The number of data lines 20 required for the fifth embodiment is 1920, and the conventional art requires 1920×3, it can be seen that the fifth embodiment of the present invention can reduce the number of data lines 20 to ⅓ of the conventional art, correspondingly, the number of data driver required is reduced, then, the LCD panel cost is reduced to enhance the competitiveness of the product.

Specifically, please refer to FIG. 6, the configuration of each pixel P in the fifth embodiment is described with: the red sub-pixel R of the first row and first column, the green sub-pixel G of the first row and the second column, and the blue sub-pixel B of the second row and the first column constitute a pixel P having a shape of upside down L-type. The red sub-pixel R of the second row and the second column, the green sub-pixel G of the third row and the first column, and the blue sub-pixel B of the third row and the second column constitute a pixel P having a shape of left and right reversed L-type. The red sub-pixel R of the first row and the third column, the green sub-pixel G of the first row and the fourth column, and the blue sub-pixel B of the second row and the third column constitute a pixel P having a shape of upside down L-type. The red sub-pixel R of the second row and the fourth row, the green sub-pixel G of the third row and the third column, and the blue sub-pixel B in the third row and the fourth column constitute a pixel P having a shape of left and right reversed L-type, and so on. As seen from FIG. 6, the shapes of the two pixels P adjacent to each other in up-down and left-right directions are complementary to be a rectangle.

Figure 7:
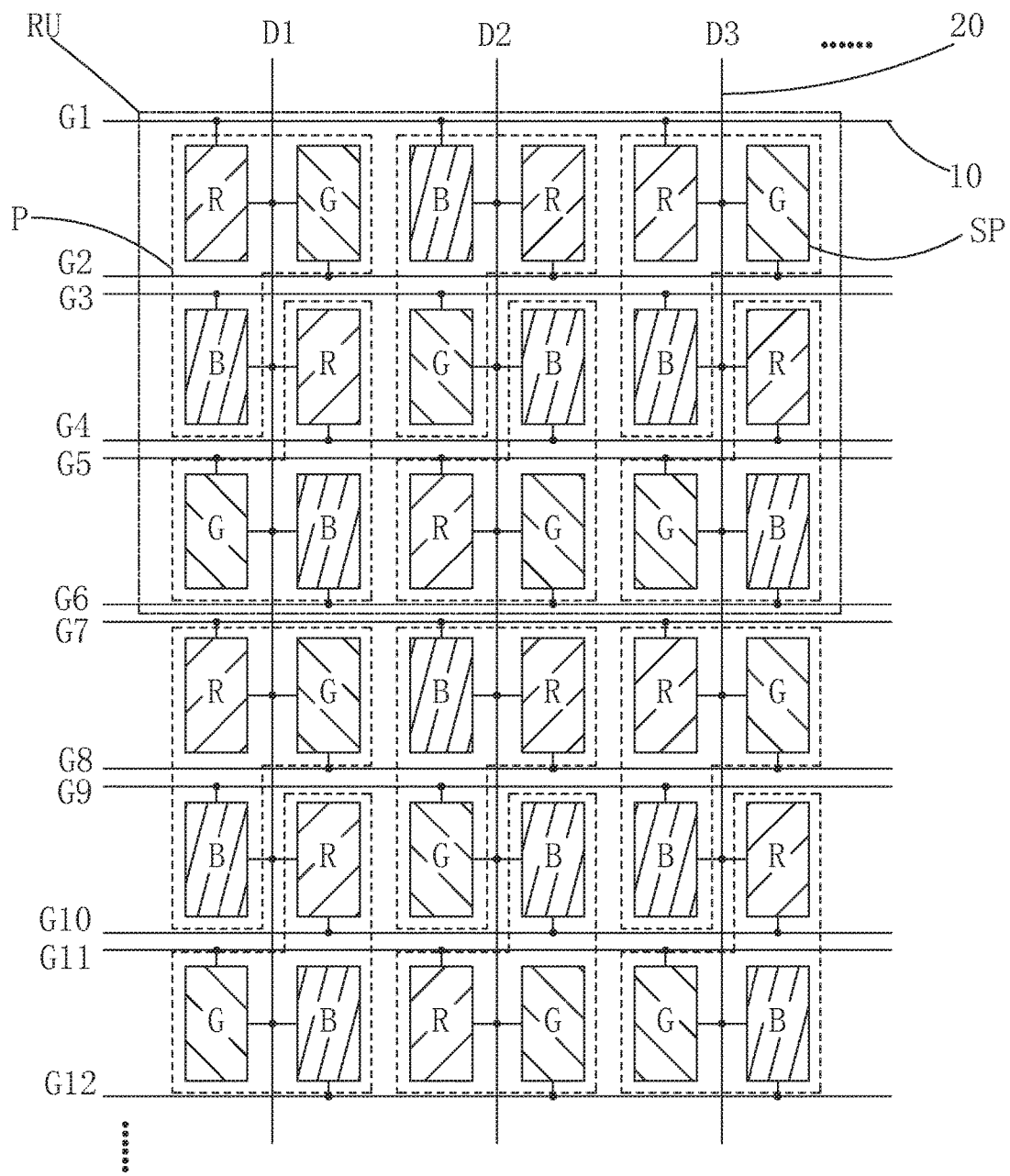
FIG. 7 is a structural diagram of a liquid crystal display panel of a sixth embodiment according to the present invention.

FIG. 7 is a structural diagram of a liquid crystal display panel of a sixth embodiment according to the present invention. Comparing the fifth embodiment and the sixth embodiment, the similarity is: the red sub-pixel R, the green sub-pixel and the blue sub-pixel B in each pixel P are disposed in the adjacent two sub-pixel SP rows. The two data lines 20 are disposed with respect to each sub-pixel SP row, and a data line 20 is disposed with respect to each two columns of sub-pixel SP. Only one data line 20 is disposed with respect to each pixel P column, and the number of data lines 20 can be reduced to ⅓ of the conventional art.

The difference is: the sub-pixels SP of every 3 rows and 6 columns are a structural unit RU. In the structural unit RU, each sub-pixel SP row comprises the sub-pixels SP of three colors, and the number of the sub-pixels SP of the same color of each sub-pixel SP row is different. For example, the first sub-pixel SP row is arranged from left to right in the order of the red subpixel R, the green subpixel the blue subpixel B, the red subpixel R, the red subpixel R, and the green subpixel G. The number of the red subpixel R is three. The number of the green sub-pixels G is two. The number of the blue sub-pixels B is one. The second sub-pixel SP row is arranged from left to right in the order of the blue sub-pixel B, the red sub-pixel R, the green subpixel the blue subpixel B, the blue subpixel B, and the red subpixel R. The number of the red subpixels R is two. The number of the green subpixels G is one. The number of the blue subpixel B is three. The third sub-pixel SP row is arranged from the left to the right in the order of the green subpixel the blue subpixel B, the red subpixel R, the green subpixel the green subpixel and the blue sub-pixel B. The number of red sub-pixel R is one. The number of the green sub-pixels G is three. The number of the blue sub-pixels B is two.

Specifically, please refer to FIG. 7, the configuration of each pixel P in the sixth embodiment is described with: the red sub-pixel R of the first row and first column, the green sub-pixel G of the first row and the second column, and the blue sub-pixel B of the second row and the first column constitute a pixel P having a shape of upside down L-type. The red sub-pixel R of the second row and the second column, the green sub-pixel G of the third row and the first column, and the blue sub-pixel B of the third row and the second column constitute a pixel P having a shape of left and right reversed L-type. The blue sub-pixel B of the first row and the third column, the red sub-pixel R of the first row and the fourth column, and the green sub-pixel G of the second row and the third column constitute a pixel P having a shape of upside down L-type. The blue sub-pixel B of the second row and the fourth row, the red sub-pixel R of the third row and the third column, and the green sub-pixel G in the third row and the fourth column constitute a pixel P having a shape of left and right reversed L-type, and so on. As seen from FIG. 7, the shapes of the two pixels P adjacent to each other in up-down and left-right directions are complementary to be a rectangle.

Figure 8:
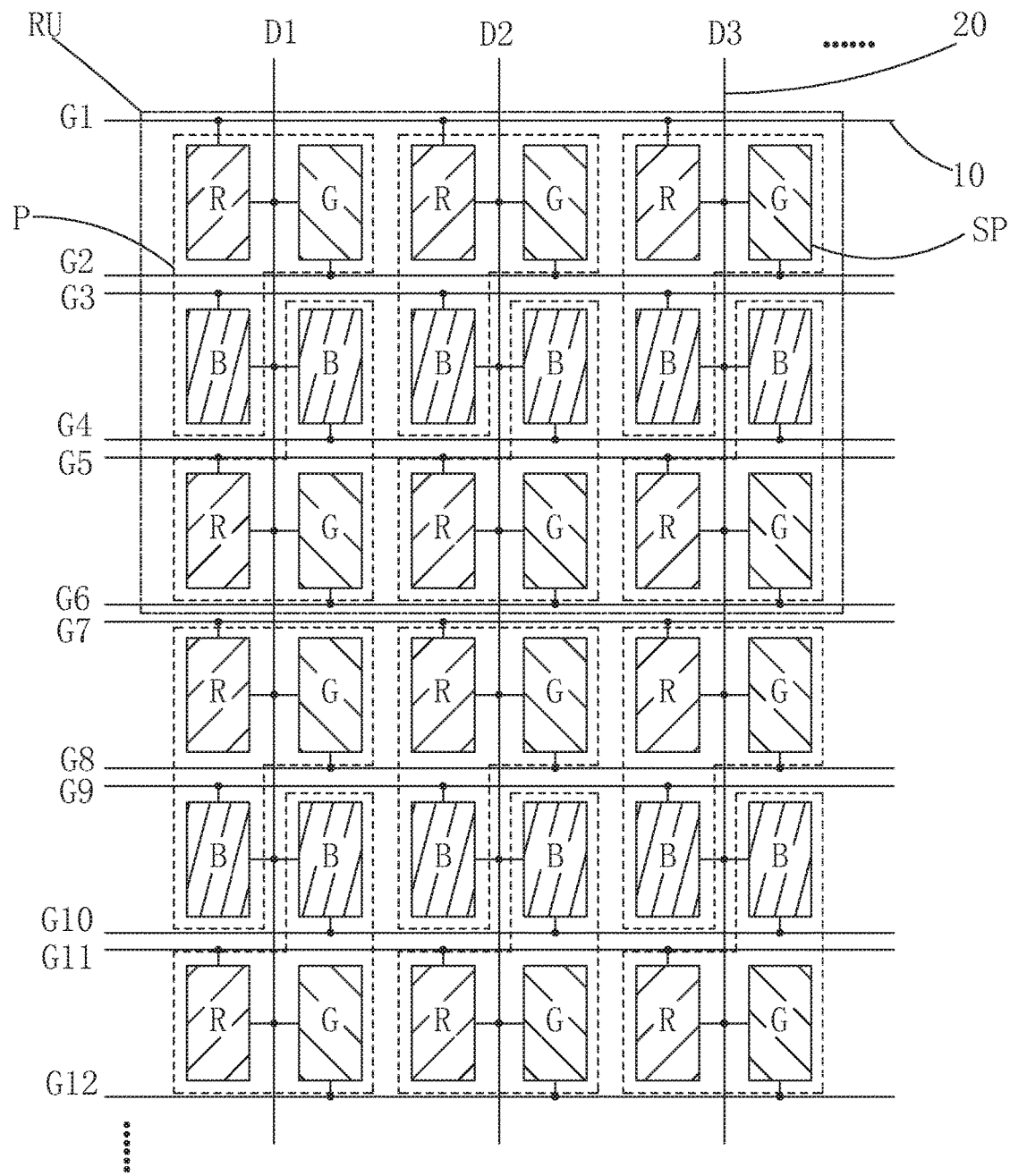
FIG. 8 is a structural diagram of a liquid crystal display panel of a seventh embodiment according to the present invention.

FIG. 8 is a structural diagram of a liquid crystal display panel of a seventh embodiment according to the present invention. Comparing the fifth embodiment and the sixth embodiment, the similarity is: the red sub-pixel R, the green sub-pixel and the blue sub-pixel B in each pixel P are disposed in the adjacent two sub-pixel SP rows. The two data lines 20 are disposed with respect to each sub-pixel SP row, and a data line 20 is disposed with respect to each two columns of sub-pixel SP. Only one data line 20 is disposed with respect to each pixel P column, and the number of data lines 20 can be reduced to ⅓ of the conventional art.

The difference is: the sub-pixels SP of every 3 rows and 6 columns are a structural unit RU. In the structural unit RU, a first sub-pixel SP row comprises the sub-pixels SP of two colors, the second sub-pixel SP row comprises sub-pixels SP of another color different from the two colors of the first sub-pixel SP row, and the third sub-pixel SP row is the same as the first sub-pixel SP row. For example, the first sub-pixel SP row is repeatedly arranged from left to right in the order of the red sub-pixel R and the green sub-pixel G; the second sub-pixel SP is all the blue sub-pixel B; and the third sub-pixel SP is also repeatedly arranged in the order of the red sub-pixel R and the green sub-pixel G.

Specifically, please refer to FIG. 8, the configuration of each pixel P in the seventh embodiment is described with: the red sub-pixel R of the first row and the first column, the green sub-pixel G of the first row and the second column, and the blue sub-pixel B in the second row and the first column constitutes a pixel P having a shape of upside down L-type. The blue sub-pixel B of the second row and the second column, the red sub-pixel R of the third row and the first column, and the green sub-pixel G of the third row and the second column constitute a pixel P having a shape of left and right reversed L-type. The red sub-pixel R of the first row and the third column, the green sub-pixel G of the first row and the fourth column, and the blue sub-pixel B of the second row and the third column a pixel P having a shape of upside down L-type. The blue sub-pixel B of the second row and the fourth column, the red sub-pixel R of the third row and the third column, and the green sub-pixels G of the third row and the fourth column constitute a pixel P having a shape of left and right reversed L-type, and so on. As seen from FIG. 8, the shapes of the two pixels P adjacent to each other in up-down and left-right directions are complementary to be a rectangle.

In summary, the liquid crystal display panel structure of the present invention is provided with that: the red sub-pixel, the green sub-pixel, and the blue sub-pixel of each pixel are arranged in two adjacent sub-pixel rows and the shape of the pixel is L-typed or inverted L-typed. The number of data lines can be reduced to ⅔ or ⅓ of the existing technology, then, the cost of liquid crystal display panels is reduced to enhance the competitiveness of products.

As mentioned above, those of ordinary skill in the art, without departing from the spirit and scope of the present invention, can make various kinds of modifications and variations to the present invention. Therefore, all such modifications and variations are intended to be included in the protection scope of the appended claims of the present invention.

What is claimed is:

1. A liquid crystal display panel structure, comprising a plurality of scanning lines extending laterally and lining up longitudinally with order, a plurality of data lines extending longitudinally and lining up laterally with order, and a plurality of sub-pixels arranged in an array; the plurality of sub-pixels arranged in an array comprising a plurality of red sub-pixels, a plurality of green sub-pixels, and a plurality of blue sub-pixels;

a red sub-pixel, a green sub-pixel, and a blue sub-pixel constitute a pixel, the red sub-pixel, the green sub-pixel, and a blue sub-pixel of the pixel distributed in two rows of adjacent sub-pixels, wherein the sub-pixels of every 3 rows and 6 columns are a structural unit and in the structural unit, each sub-pixel row comprises the sub-pixels of only two colors, and the sub-pixels of two adjacent sub-pixels rows only comprise the sub-pixels of one color in common, and wherein the two colors of the sub-pixels of a first one of two adjacent sub-pixel rows includes a first one and a second one of the three colors of red, green, and blue and the two colors of the sub-pixels of a second one of the two adjacent sub-pixel rows include a second one and a third one of the three colors of red, green, and blue, the second color being common to both the first and second sub-pixel rows, the first color of the first sub-pixel row being different from the third color of the second sub-pixel-row.

2. The liquid crystal display panel structure according to claim 1, wherein a shape of the pixel is L-type or inverted L-type.

3. The liquid crystal display panel structure according to claim 2, wherein one scanning line is disposed with respect to each sub-pixel row, and one data line is disposed with respect to each sub-pixel column;

"a" is assumed as a positive integer, a a-th scanning line is disposed at the upper side of a a-th sub-pixel row, all sub-pixels of the a-th row are electrically connected with the a-th scanning line; "b" is assumed as a positive integer, a b-th data line is disposed at the left side of a b-th sub-pixel column, all sub-pixels of the b-th column are electrically connected with the b-th data line, only two data lines are disposed with each pixel column.

4. The liquid crystal display panel structure according to claim 3, wherein the sub-pixels of every 3 rows and 6 columns are a structural unit; in the structural unit, each sub-pixel row comprises the sub-pixels of three colors, and the number of the sub-pixels of the same color of each sub-pixel row is the same.

5. The liquid crystal display panel structure according to claim 3, the sub-pixels of every 3 rows and 6 columns are a structural unit; in the structural unit, a first sub-pixel row comprises the sub-pixels of two colors, the second sub-pixel row comprises sub-pixels of another color different from the two colors of the first sub-pixel row, and the third sub-pixel row is the same as the first sub-pixel row.

6. The liquid crystal display panel structure according to claim 2, wherein two scanning line is disposed with respect to each sub-pixel row, and one data line is disposed with respect to two columns of sub-pixel;

"m" is assumed as a positive integer, a (2m−1)th scanning line is disposed at the upper side of a m-th sub-pixel row, a (2m)th scanning line is disposed the bottom side of the m-th sub-pixel row, all odd-columned sub-pixels of the m-th row are electrically connected with the (2m−1)th scanning line, all even-columned sub-pixels of the m-th row are electrically connected with the (2m)th scanning line; "n" is assumed as a positive integer, a n-th data line is disposed between a (2n−1)th sub-pixel column and a 2n-th sub-pixel column, the (2n−1)th sub-pixel column and the 2n-th sub-pixel column are electrically connected with the n-th data line, only one data line is disposed with each pixel column.

7. The liquid crystal display panel structure according to claim 6, wherein the sub-pixels of every 3 rows and 6 columns are a structural unit; in the structural unit, each sub-pixel row comprises the sub-pixels of two colors, and the sub-pixels of two adjacent rows only comprise the sub-pixels of one color in common.

8. The liquid crystal display panel structure according to claim 6, wherein the sub-pixels of every 3 rows and 6 columns are a structural unit; in the structural unit, each sub-pixel row comprises the sub-pixels of three colors, and the number of the sub-pixels of the same color of each sub-pixel row is different.

9. The liquid crystal display panel structure according to claim 6, the sub-pixels of every 3 rows and 6 columns are a structural unit; in the structural unit, a first sub-pixel row comprises the sub-pixels of two colors, the second sub-pixel row comprises sub-pixels of another color different from the two colors of the first sub-pixel row, and the third sub-pixel row is the same as the first sub-pixel row.

* * * * *